May 16, 1950     M. P. BARROT     2,508,089

SUSPENSION DEVICE FOR THE SHAFTS OF ROTARY CRUSHERS

Filed Nov. 8, 1945

INVENTOR.
MARCEL PAUL BARROT,
BY
ATTORNEYS.

Patented May 16, 1950

2,508,089

UNITED STATES PATENT OFFICE 2,508,089

SUSPENSION DEVICE FOR THE SHAFTS OF ROTARY CRUSHERS

Marcel Paul Barrot, Clichy, France, assignor to Compagnie des Enterprises Industrielles, Paris, France, a corporation of France Application November 8, 1945, Serial No. 627,419
In France February 9, 1945

2 Claims. (Cl. 308—142)

My invention relates to a device for the suspension of the shaft supporting the breaking cone in rotary crushers.

A device of this kind is already known in which the upper part of such supporting shaft carries a ring called a "suspension ring," the cheeks and lower edge of which have a conical shape. The lower edge of said ring rests on a plane ring called a "wearing ring" arranged in a cylindrical ring called the "cross-head bushing." This bushing is centered rigidly in the upper cross-head of the crusher, said crusher being itself bored cylindrically.

Such a device, which makes it possible for the suspension ring to rotate with its lower face on the "wearing ring" and with its sides or cheeks bearing on the internal vertical face of the "cross-head bushing," insures a precise guiding and rigid support for the head of the shaft.

The above described device, however, offers a serious disadvantage because of the fact that it is very difficult, on mounting the breaker, to align the head and foot bearings of the shaft properly and to maintain such alignment after an extended period of use. This lack of alignment between the said bearings entails a wear of the suspension pieces, which, accordingly, gives rise to a certain play between such pieces and reduces the crushing efficiency of the crusher.

Furthermore, the above mentioned play, causes a knocking of the "suspension ring" inside the "cross-head bushing," which knocking still further accelerates the wear of the suspension pieces. Thus, such a suspension device is rapidly worn out. It is important, therefore, that the beginning of wear should be avoided to the utmost, and the avoidance of such wear comprises one of the important objects of my invention.

In another of the presently known suspension devices, the shaft carrying the breaking cone is provided with a head which is at least partly spherical and which is fitted in an internally spherical and externally cylindrical bushing, which arrangement amounts to securing the head of the shaft to the cross-head by means of a ball. In this case the alignment of the bearings is obtained automatically, but it has an important drawback in that the ball then rocks and rotates continually in the bushing with the result that there is a great amount of sliding friction which entails a rapid wear of the said pieces, the same disadvantages, therefore, being inherent in this device as were described in connection with the first mentioned device.

My invention has for its primary object the provision of a suspension device which makes it possible to avoid these disadvantages by insuring the alignment of the bearings in an automatic and continuous manner, at the same time taking advantage of the benefits resulting from the substitution of a rolling friction for a sliding friction.

To this end, the "cross-head bushing," in the cylindrical bore of which a conical suspension ring rolls has a spherical external shape and is fitted in a corresponding recess provided in the cross-head.

The unit formed of the bushing and the "wearing ring" can, therefore, automatically take the proper position according to the requirements during assembly.

The recess provided in the cross-head may comprise a simple, partially spherical portion terminating at its lower end in a bore extending through the cross-head for the passage of the head of the shaft. In this case, the cross-head can be made in one piece and the spherical bushing maintained therein by the weight of the moving parts. Said recess may also have the shape of a spherical ring encompassing the bushing.

Other features, objects and advantages of my invention will become apparent to one skilled in the art during the course of the following description, reference being had to the accompanying drawings in which like numerals are used to designate like parts throughout the same, and in which.

Figure 1:
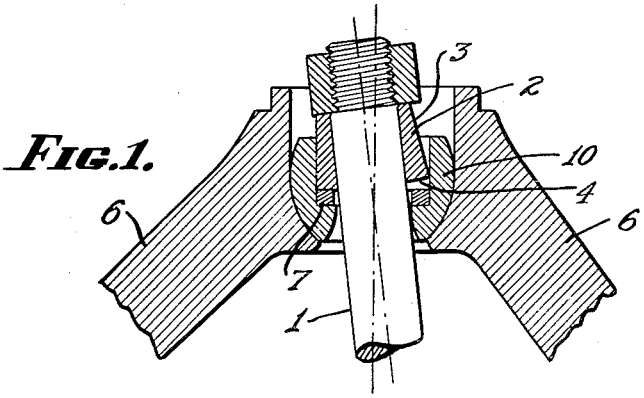
Figure 1 is a fragmentary sectional view of one embodiment of my invention.

Referring now to Figure 1, it will be noted that the shaft 1 of the crusher carries a ring 2, the surfaces 3 and 4 of which are conical with respect to the bore therethrough. An element of the conical surface 3 forms an angle with the center line of the shaft 1, which is equal to the angle formed by the center line of the shaft 1 when in operative position with the axis of the crusher. This angle is equal to the inclination imparted to the shaft by the driving apparatus, that is, it is equal to the half apex angle of the cone described by the center line of the shaft. This angle is defined in the design of the crushing apparatus and is the angle formed by the center line of the shaft with the axis of the crusher. An element of the conical surface 4 forms a right angle with an element of the conical surface 3.

The ring 2 is mounted in the cylindrical bore of a bushing 10 located in the cross-head 6. The cross-head bushing 10 has externally a spherical shape and is fitted in a cylindrical-spherical recess provided in the cross-head 6. The "wearing ring" 7 bears on a shoulder provided in the bushing 10.

The shaft 1, while rotating, makes a substantially constant angle with the axis of the apparatus and the ring 2 runs in the unit formed of the bushing 10 and the ring 7. By virtue of the just described relationship between the bushing 10 and cross-head 6, the bushing 10 can rock in its recess and thus place itself in alignment with the lower bearing of the shaft. In this manner, I obtain a perfect support for the suspension ring 2 on the wearing ring 7 and against the inner face of the bushing 10. Such an arrangement enables the head gear of the apparatus to be made with a great deal of precision, thus eliminating chatter and insuring a longer life of the members comprising this gear. And in addition, the maximum rigidity of the bearing point is thus achieved, this fact considerably increasing the crushing efficiency of the apparatus.

Figure 2:
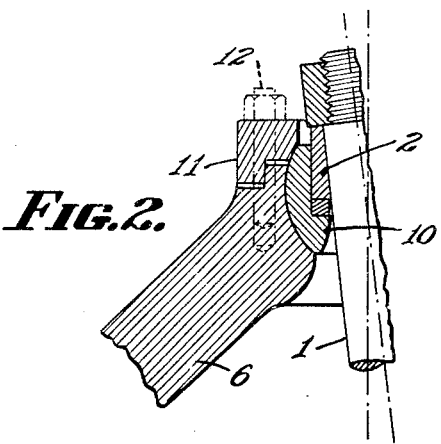
Figure 2 is a partial, fragmentary half-view (sectional) of a modification of my invention.

In the modification shown in Figure 2, the bushing 10 is maintained in its proper position by a flange 11 which may be firmly tightened to the cross-head 6 by means of bolts such as shown at 12.

Figure 3:
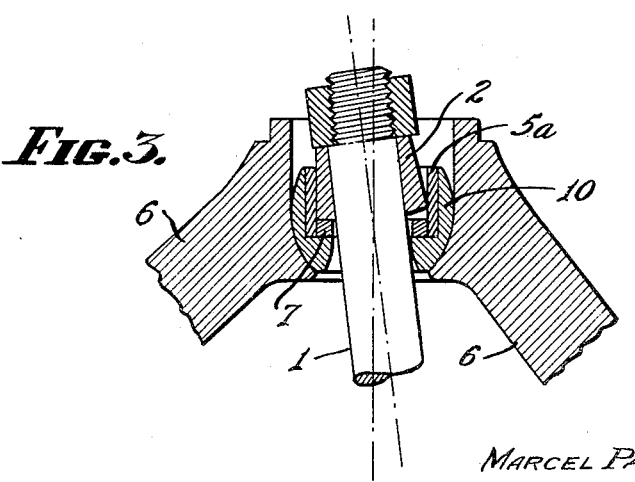
Figure 3 is a view similar to that of Figure 1 but showing still another modification of my invention.

In the modification shown in Figure 3, a ring 5a is provided inside the spherical bushing 10. This ring can, when worn, be replaced by a new one without it being necessary to interfere with the spherical bushing 10.

It is to be understood that the modification of Figure 2 may or may not include the ring 5a just described in connection with the modification of Figure 3.

It is to be understood that modifications may be made to my invention without departing from the scope and spirit thereof, and, although I have, by way of example, shown certain apparatus embodying the features of my invention, I do not intend to be limited by the specific structure set forth herein except insofar as such structure is specifically recited in the subjoined claims.

Having thus described my invention, what I claim as new and desire to protect by United States Letters Patent is:

1. A bearing structure for the oscillating and rotating crushing core shaft in a rotary crusher or the like having a crosshead, comprising a suspension ring on said shaft, said ring having a conical outer surface and a conical lower edge surface, an element of said first conical surface forming an angle with the axis of said shaft equal to the angle between the axis of said shaft, when in operative position, and the axis of said crusher, and an element of said second conical surface forming a right angle with an element of said first conical surface, a spherical recess in said crosshead and an externally spherical bushing in said recess, said bushing having a cylindrical and a plane bearing surface on its inside to cooperate with said conical surfaces.

2. A device according to claim 1, in which said crosshead is provided with a clamping collar for said bushing.

MARCEL PAUL BARROT.

REFERENCES CITED

The following references are of record in the file of this patent:

UNITED STATES PATENTS

| Number | Name | Date |
| --- | --- | --- |
| 839,891 | Rhodes | Jan. 1, 1907 |
| 1,321,767 | Mackintosh | Nov. 11, 1919 |
| 1,608,913 | Stovall | Nov. 30, 1926 |
| 1,641,715 | Weimer | Sept. 6, 1927 |